United States Patent [19]

Farag et al.

[11] Patent Number: 4,652,966
[45] Date of Patent: Mar. 24, 1987

[54] SOLENOID-ACTUATED MECHANICAL INTERLOCK FOR A MOTOR CONTROLLER

[75] Inventors: Samir F. Farag; John D. Kleinecke; Randy M. Smith, all of Wichita Falls, Tex.

[73] Assignee: Siemens Energy & Automation, Inc., Atlanta, Ga.

[21] Appl. No.: 821,705

[22] Filed: Jan. 23, 1986

[51] Int. Cl.⁴ .............................................. H01H 9/00
[52] U.S. Cl. ................................................... 361/189
[58] Field of Search ......................................... 361/189

[56] References Cited
U.S. PATENT DOCUMENTS 4,427,854  1/1984  Kleinecke et al. ............ 200/50 AA
4,447,858  5/1984  Farag et al. ......................... 361/429

Primary Examiner—Michael L. Gellner
Attorney, Agent, or Firm—F. W. Powers; J. L. James

[57] ABSTRACT

A solenoid actuated mechanical interlock is provided for the draw-out type circuit breaker mechanism of a motor control center. The interlock is formed by the plunger of the solenoid engaging a slot in the bellcrank mechanism of the draw-out unit. Electric circuitry controls operation of the solenoid so that the plunger is controllably extended and retracted to prevent or permit operation of the bell crank under certain conditions.

22 Claims, 6 Drawing Figures

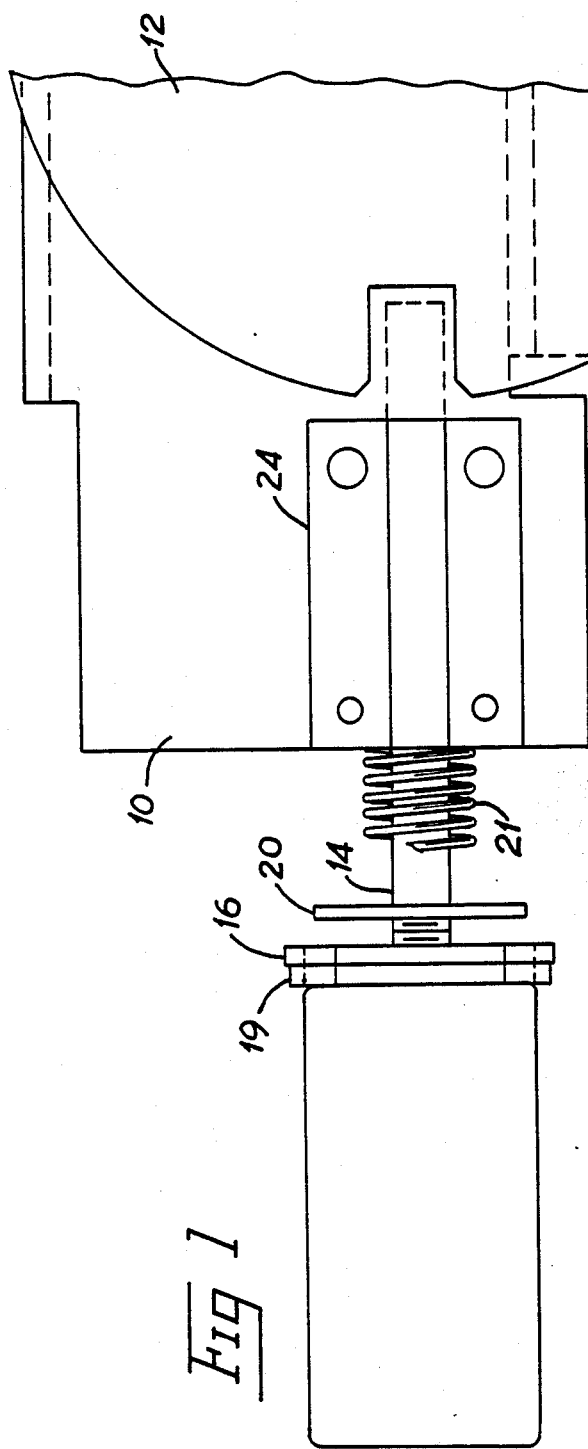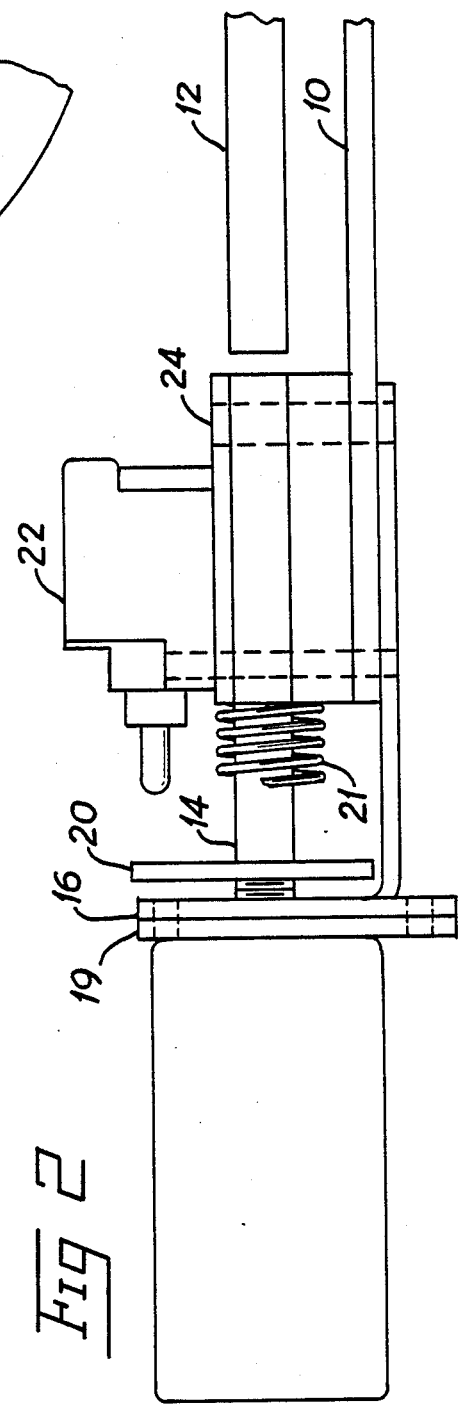

SOLENOID-ACTUATED MECHANICAL INTERLOCK FOR A MOTOR CONTROLLER

BACKGROUND OF THE INVENTION

This invention relates to a motor controller which has a draw-out carriage assembly and more particularly to an interlock for preventing the carriage assembly from being racked-in or racked out when the main contactor is energized.

When the main contactor of a draw-out type circuit breaker is closed, racking the carriage assembly in or out will cause the stab assembly to make or break load current which can cause severe arcing and overheating of the stab assembly. It is therefore desirable to rack the carriage assembly in or out only when the main contactor is open which prevents severe arcing and overheating of the carriage stab assembly. The carriage assembly usually has a handle which has an "ON" position and an "OFF" position. In the "ON" position, the carriage assembly is racked-in and the stab assembly is engaged with the bus bars and in the "OFF" position, the carriage assembly is racked-out and the stab assembly is disengaged from the bus bars. The handle normally operates some mechanical linkage arrangement which affects the racking in and racking out of the carriage assembly.

U.S. Pat. Nos. 4,427,854 and 4,447,858 disclose motor control centers which have a draw-out type circuit breaker. A handle is attached to a bellcrank which translates the motion of the handle into a motion which racks the carriage assembly in and out connecting and disconnecting the stab assembly from the bus bars. The carriage assembly includes a lever which has a finger which engages notches in the bellcrank. When the contactor is opened, the lever is held away from the bellcrank so that the finger does not engage either notch and the carriage assembly can be moved in or out. When the carriage assembly is racked-in and the main contactor closes, the finger engages the first notch and the carriage assembly cannot be racked out until the main contactor is open. When the finger rides along the surface between the first and second notches, the main contactor is prevented from closing. In order to assure that circuit making and breaking is done only by the contactor elements, racking of an already closed contactor is prevented. With the contactor closed, the interlock lever is rotated clockwise so that the finger engages the second slot in the bellcrank. In this position, power is available to operate the contactor but the mechanism is arranged such that the carriage cannot be racked-in when the finger engages the second notch. While this interlock arrangement performs as designed, its performance is dependent upon the interlock lever being mechanically operated by a push bar which is connected or linked to the main contactor. It will be appreciated that where a vacuum contactor is used, there is no external moving part on which to connect such a bar. Accordingly, it will be appreciated that it would be highly desirable to provide a mechanical interlock which can be used with a vacuum contactor.

Accordingly, it is an object of the present invention to provide a mechanical interlock for preventing the racking-in and racking-out of the carriage assembly when the contactor is energized.

Another object of the invention is to provide a mechanical interlock which is free of mechanical connection to the moving parts of the vacuum contactor.

SUMMARY OF THE INVENTION

Briefly stated, in accordance with one aspect of the invention, the foregoing objects are achieved by providing a solenoid actuated mechanical interlock for a motor controller. The motor controller has a frame and a bellcrank with a slot therein attached to the frame. A solenoid has a plunger movable between a retracted position at which the plunger is free of engagement with the bellcrank and an extended position at which the plunger engages the slot.

The plunger engages the slot providing a mechanical interlock. The solenoid is electrically operated and is free of mechanical connection to the moving parts of the contactor.

BRIEF DESCRIPTION OF THE DRAWINGS

While the specification concludes with claims particularly pointing out and distinctly claiming the subject matter which is regarded as the invention, it is believed that the invention would be better understood from the following description of the preferred embodiment taken in conjunction with the accompanying drawings in which:

FIG. 1 illustrates a solenoid actuated interlock in accordance with the present invention wherein the solenoid actuator is positioned for engagement with a bellcrank;

FIG. 2 is a side view of the solenoid actuated interlock of FIG. 1 with a limit switch attached;

DESCRIPTION OF A PREFERRED EMBODIMENT

Figure 4:
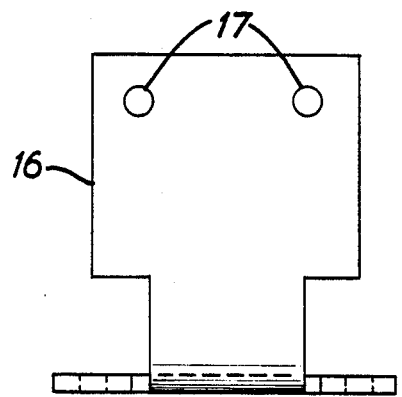
FIG. 4 is a right side of the mounting bracket illustrated in FIG. 3.
Figure 3:
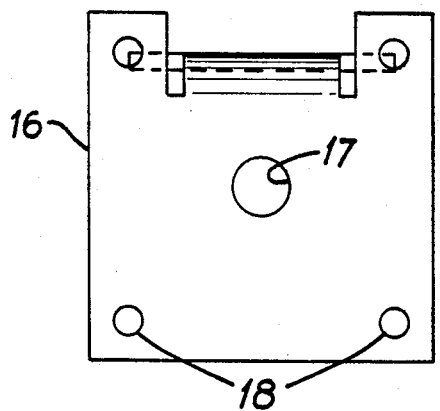
FIG. 3 illustrates a solenoid support bracket.
Figure 5:
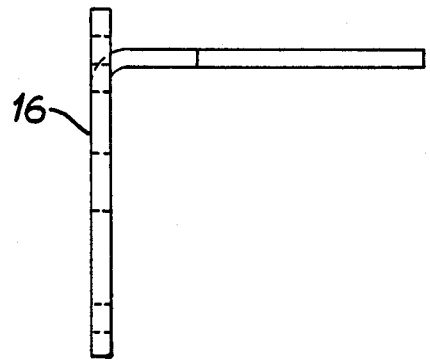
FIG. 5 is a side view of the solenoid support bracket illustrated in FIG. 3.

Referring to FIG. 1, a motor control center has a draw-out carriage assembly which has a frame 10 and a bellcrank 12 pivotally mounted on the frame 10. The bellcrank facilitates the racking-in and racking-out of the carriage assembly as is known in the art.

A solenoid with a plunger 14 is connected to the frame 10. The plunger 14 is movable between an extended position at which the plunger engages a notch in the bellcrank and a retracted position at which the plunger is retracted and free of engagement with the notch in the bellcrank.

Referring to FIGS. 1-5, the solenoid is connected to the frame by an L-shaped mounting bracket 16. The mounting bracket 16 preferably has holes 15 drilled therein for easy mounting to the frame and has a generally square portion with a centrally located opening 17 for receiving the plunger 14 therethrough. The square portion preferably has a plurality of holes 18 for connection to the housing of the solenoid as by bolts or screws. The L-shaped bracket can be conveniently stamped out of a single piece of sheetmetal of sufficient thickness to support the solenoid during operation of the solenoid actuated mechanical interlock. The solenoid housing is equipped with a plate or flange 19 to which the bracket easily attaches.

A switch-actuating member 20 is attached to the plunger 14 and travels with the plunger as the plunger moves between its extended and retracted positions. The switch-actuating member 20 may take the form of a threaded washer which is matable with threads on the plunger 14. The switch-actuating member 20 also serves to retain a spring 21 which is encoiled about the plunger. The spring 21 provides energy for returning the plunger 14 to its retracted position when the solenoid is deenergized. The switch actuator 20 operates a limit switch 22 when the plunger 14 is extended. The limit switch is connected to the frame 10.

A guide 24 is preferably connected to the frame 10. The limit switch 22 may be connected to the guide 24. The guide has a bore or opening therein forming a space and the plunger 14 extends through the space and reciprocates therein. As viewed in FIG. 1, the plunger, in addition to its reciprocating movement to the left and to the right, is capable of vertical movement. It is desirable to minimize this vertical movement so that a more stable interlock is provided. It is therefore a function of the guide to limit the vertical movement of the plunger. In the preferred embodiment a guide block is positioned adjacent the frame with one end adjacent the bellcrank and the other end facing the solenoid with the opening extending through the block from one end to the other end. The opening has a size and configuration sufficient for supporting the plunger for reciprocal movement therein. The guide block can be constructed of any material in which there can be developed good sliding motion between the plunger and the bore in the block. The guide block is useful to help confine the compression spring 20.

There has thus been described in FIGS. 1 through 5 a solenoid-actuated mechanical interlock for a motor controller of the type which has a frame and bellcrank with a slot attached to the frame. The solenoid has a plunger movable between a retracted position at which the plunger is free of engagement with the bellcrank and an extended position at which the plunger engages the bellcrank slot. The solenoid-actuated interlock also includes means for controllably energizing the solenoid and effecting movement of the plunger between the retracted and extended positions.

Figure 6:
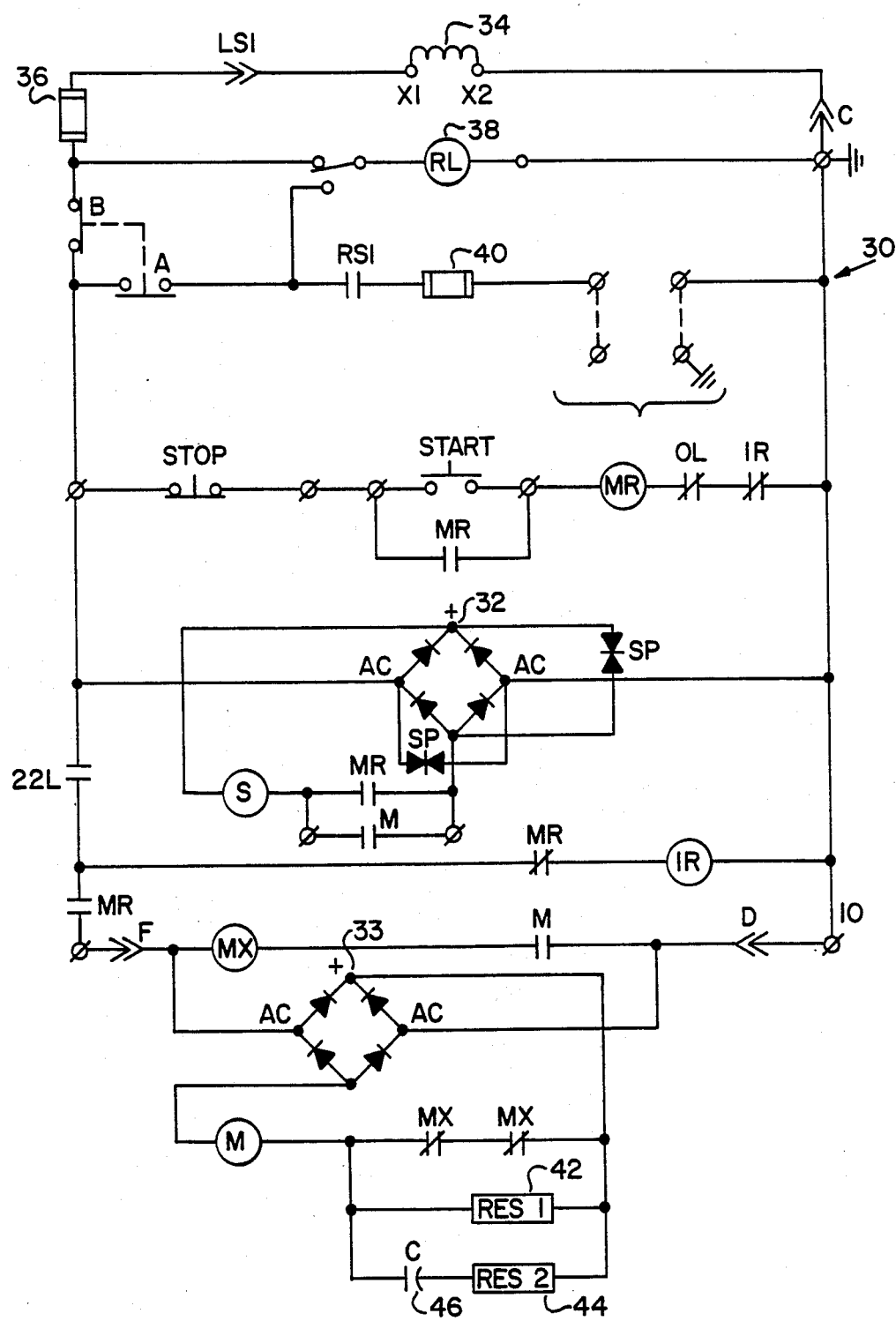
FIG. 6 is a schematic diagram of a circuit for controlling operation of the solenoid.

Referring to FIG. 6, the means for controllably energizing the solenoid and effecting movement of the plunger between the retracted and extended positions includes a control circuit 30. In the circuit, power is delivered to a full-wave bridge rectifier 32 which is equipped with surge suppressors SP which are molded into the rectifier block. Power to the rectifier comes from transformer 34 by way of the line switch interlock LSI and a fuse 36 for the control power transformer 34. A high voltage light 38 is connected in parallel with the fuse 36 and power transformer 34. One side of the bridge rectifier 32 is grounded along with one side of the light 38 and the transformer 34. The other side of the rectifier 32 is connected to the transformer 34 by way of the fuse 36 and a test switch AB. Connected in parallel with the light is a branch circuit including a stop switch, a master control relay MR and start switch. Normally open contacts of the master relay MR are in parallel with the start button. In series with the master relay MR are normally closed contacts OL and normally closed contacts IR. Also in parallel with light 38 is a circuit which includes normally open contacts of test switch AB which are in series with normally open racking switch interlock RSI which is in series with the test switch fuse 40 and user or customer supplied test power.

The circuit 30 also includes a solenoid coil S in series with normally open contacts MR of the control relay. The solenoid S and normally open contacts MR are connected to the output of the rectifier 32. Normally open main contacts M are connected in parallel with normally open contacts MR. Also connected to the ungrounded side of transformer 34 are normally open contacts 22L in series with normally open contacts MR. The other side of contact MR is connected to auxiliary relay MX which is connected in series with normally open contacts M. The other side of normally open contacts M is connected to the grounded side of transformer 34. Rectifier 33 is connected such that one of its AC terminals is connected to the terminal of coil MX which is also connected to contacts MR and the other AC terminal is connected to the grounded side of transformer 34. Main contactor relay M is in series with normally closed contacts MX of the auxiliary relay and this circuit is connected to the positive and negative terminals of rectifier 33. There are preferably two sets of normally closed auxiliary relay contacts MX. These contacts have surge suppressing resistors and capacitors 44, 46 and economizing resistor 42 connected in parallel therewith. The circuit also contains a set of normally closed contacts MR in series with relay coil IR. This series combination is connected between the junction of contacts 22L and contacts MR and the grounded side of transformer 34.

As set forth above, the motor controller has a contactor main coil and a control relay having a pair of contacts in series with the solenoid. A start button is used for energizing the control relay and a stop button is used for deenergizing the control relay. A limit switch connected in series with the contactor main coil is operable in response to predetermined movement of the plunger. Deenergization of the solenoid retracts the plunger from the bellcrank slot and opens the limit switch. An economizing relay is connected in parallel with the contactor main coil and has its contacts in series with the main coil. The main coil has a set of contacts in series with the economizing relay whereby the economizing relay energizes thereby reducing the current drawn by the contactor. A set of auxiliary contacts of the contactor closes in parallel with the control relay contacts and keeps the solenoid energized even when the control relay contacts open.

The limit switch is connected in series with the main contactor and is operable in response to predetermined movement of the plunger. Failure of the solenoid coil causes the limit switch to remain inactivated preventing closing of the contactor. Failure of the solenoid coil could also cause the limit switch to open causing the contactor to open. Deenergization of the solenoid retracts the plunger from the bellcrank slot and opens the limit switch.

Operation of the solenoid actuated mechanical interlock is best described by going through a contactor closing sequence and a contactor opening sequence and discussing safeguards against possible modes of failure of the system. The contactor closing sequence is begun by pressing the start button which energizes control relay MR. When control relay MR energizes, the MR contact in series with the solenoid S closes thereby energizing the solenoid coil. The mechanical interlock plunger is depressed by the solenoid preventing motion of the racking mechanism and operating the limit switch 22. Limit switch contacts 22L close energizing vacuum contactor main coil M which closes the main power contacts. Economizing relay MX picks up reducing current drawn by the main coil M. Auxiliary contact M of the vacuum contactor closes in parallel with the contact MR which ensures that the solenoid coil remains energized even if MR opens.

In the contactor opening sequence, the stop button is pressed deenergizing control relay MR. The MR contact in series with the main coil M opens and causes the main power contacts of the vacuum contactor to open. Auxiliary contact M in parallel with contact MR opens and deenergizes the solenoid coil S. The mechanical interlock plunger is released allowing motion of the racking mechanism and opening contact 22L of the limit switch.

With the solenoid-actuated mechanical interlock described above, if the solenoid coil would happen to burn out or develop an open circuit during the starting sequence, the limit switch will not be activated and the vacuum contactor will not close. If the solenoid coil burned out or opened while the contactor is closed, contact 22L of the limit switch will open and deenergize the vacuum contactor main coil M causing the vacuum contactor to open. If the coils of either MR or M burn out or open, the vacuum contactor will not close. If the solenoid binds mechanically and will not close, this has the same effect as if the solenoid coil burned out. If the solenoid binds mechanically and will not open, then contact 22L will remain closed and the vacuum contactor will remain closed. If there is a power failure, then, since both the vacuum contactor coil and the solenoid are supplied by the same source, both devices will deenergize and will open.

If the main power contacts of the vacuum contactor become welded closed, then the vacuum contactor armature is restrained from opening and auxiliary contact M in parallel with contact MR remain closed keeping the solenoid coil S energized which mechanically prevents operation of the racking mechanism. If the contacts 22L become welded closed for some reason, then the contact MR in series with the vacuum contactor coil M will open and cause the vacuum contactor to open if the stop button is pressed. If contacts 22L become welded closed and the stop button is pressed, then relay IR will be energized and its contacts in series with relay MR will open and prevent the reclosing of vacuum contactor M. None of the above component failure modes will result in a situation where the vacuum contactor can be racked in or racked out with the vacuum contactor closed.

It will now be understood that there has been disclosed a solenoid actuated mechanical interlock for a motor controller which can be used with a vacuum contactor to prevent removal or insertion of the carrier under certain specified conditions.

As will be evidenced from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters Patent of the United States is:

1. A solenoid-actuated mechanical interlock for a motor controller of the type having a frame and a bellcrank with a slot attached to the frame, comprising:
    a solenoid having a plunger movable between a retracted position at which the plunger is free of engagement with the bellcrank and an extended position at which the plunger engages the slot.

2. A solenoid-actuated interlock according to claim 1, including means for controllably energizing said solenoid and effecting movement of the plunger between the retracted and extended positions.

3. A solenoid-actuated mechanical interlock according to claim 2, wherein the controller has a contactor main coil wherein the control means includes:
    a control relay having a set of contacts in series with the solenoid;
    a start button for energizing the control relay;
    a stop button for deenergizing the control relay;
    a limit switch connected in series with the contactor main coil and operable in response to predetermined movement of the plunger.

4. A solenoid-actuated mechanical interlock according to claim 3, including an economizing relay in parallel with the contactor main coil having its contacts in series with the main coil, said main coil having a set of contacts in series with the economizing relay whereby the economizing relay energizes reducing the current drawn by the contactor.

5. A solenoid-actuated mechanical interlock according to claim 4, wherein a set of auxiliary contacts of the contactor closes in parallel with the control relay contacts and keeps the solenoid energized even when the control relay contacts open.

6. A solenoid-actuated mechanical interlock according to claim 3, wherein deenergization of the solenoid retracts the plunger from the bellcrank slot and opens the limit switch.

7. A solenoid-actuated mechanical interlock according to claim 1, including means for mounting said solenoid in operable fixed position.

8. A solenoid-actuated mechanical interlock according to claim 7, wherein the mounting means includes an L-shaped mounting bracket having one leg of the L connected to the frame and the other leg of the L connected to the solenoid.

9. A solenoid-actuated mechanical interlock according to claim 7, wherein the mounting means includes a guide block connected to the frame with one end adjacent the bellcrank and the other end facing the solenoid and having an opening extending through the block from one end to the other end of a size and configuration sufficient for supporting the plunger for reciprocal movement therein.

10. A solenoid-actuated mechanical interlock according to claim 9, including a spring stop connected to the plunger and a spring encoiled about the plunger abutting the spring stop and guide block for retracting the plunger.

11. A motor controller, comprising:
    a frame;
    a bellcrank having a slot and being mounted on the frame;
    a main contactor connected to the frame movable between a racked-in position and a racked out position;
    a solenoid having a plunger movable between a retracted position at which the plunger is free of engagement with the bellcrank and an extended position at which the plunger engages the slot;

means for mounting the solenoid on the frame;

means for controllably energizing the solenoid and effecting movement of the plunger between the retracted and extended positions; and means for preventing the main contactor from being racked in or racked out under preselected conditions when contactor is closed.

12. A motor controller according to claim 11, wherein the preventing means includes a limit switch connected in series with the main contactor and operable in response to predetermined movement of the plunger.

13. A motor controller according to claim 11, wherein failure of the solenoid coil causes the limit switch to remain inactivated preventing closing of the contactor.

14. A motor controller according to claim 11, wherein failure of the solenoid coil causes the limit switch to open causing the contactor to open.

15. A motor controller according to claim 11, wherein the mounting means includes an L-shaped mounting bracket having one leg of the L connected to the frame and the other leg of the L connected to the solenoid.

16. A motor cntroller according to claim 11, wherein the mounting means includes a guide block connected to the frame with one end adjacent the bellcrank and the other end facing the solenoid and having an opening extending through the block from one end to the other end of a size and configuration sufficient for supporting the plunger for reciprocal movement therein; and a spring stop connected to the plunger and a spring encoiled about the plunger abutting the spring stop and guide block for retracting the plunger.

17. A motor controller according to claim 11, wherein the control means includes:

a control relay having a set of contacts in series with the solenoid;

a start button for energizing the control relay;

a stop button for deenergizing the control relay;

a limit switch connected in series with the contactor main coil and operable in response to predetermined movement of the plunger.

18. A motor controller according to claim 17, including an economizing relay in parallel with the contactor main coil having its contacts in series with the main coil, said main coil having a set of contacts in series with the economizing relay whereby the economizing relay energizes reducing the current drawn by the contactor.

19. A motor controller according to claim 18, wherein a set of auxiliary contacts of the contactor closes in parallel with the control relay contacts and keeps the solenoid energized even when the control relay contacts open.

20. A motor controller according to claim 19, wherein deenergization of the solenoid retracts the plunger from the bellcrank slot and opens the limit switch.

21. A motor controller according to claim 17, including an interlock relay having a coil connected in series with the limit switch and contacts of the control relay and having a set of contacts in series with the control relay coil whereby operation of the interlock relay opens the interlock relay contacts and prevents operation of the control relay.

22. A motor controller according to claim 21, wherein welding of the limit switch contacts during operation causes the interlock relay to operate when the stop button is pressed to deenergize the control relay and operation of the interlock relay opens the current path for the control relay preventing reoperation of the control relay and prevents operation of the contactor main coil.

* * * * *